US008289854B1

(12) United States Patent
Nedbal et al.

(10) Patent No.: US 8,289,854 B1
(45) Date of Patent: Oct. 16, 2012

(54) SYSTEM, METHOD, AND COMPUTER PROGRAM PRODUCT FOR ANALYZING A PROTOCOL UTILIZING A STATE MACHINE BASED ON A TOKEN DETERMINED UTILIZING ANOTHER STATE MACHINE

(75) Inventors: Manuel Nedbal, Bangalore (IN); Johannes Mayr, Linz (AT); Keith Eric Amidon, Los Altos, CA (US)

(73) Assignee: McAfee, Inc., Santa Clara, CA (US)

( * ) Notice: Subject to any disclaimer, the term of this patent is extended or adjusted under 35 U.S.C. 154(b) by 454 days.

(21) Appl. No.: 11/946,758

(22) Filed: Nov. 28, 2007

(51) Int. Cl.
*H04L 12/26* (2006.01)

(52) U.S. Cl. ....................................................... 370/241

(58) Field of Classification Search .................. 370/241, 370/242, 252, 253; 726/23–25; 709/224, 709/217, 218
See application file for complete search history.

(56) References Cited

U.S. PATENT DOCUMENTS

| 5,414,833 | A  | * | 5/1995  | Hershey et al. ................. 726/22 |
|-----------|----|---|---------|----------------------------------------|
| 6,718,328 | B1 | * | 4/2004  | Norris ........................... 709/229 |
| 6,782,424 | B2 | * | 8/2004  | Yodaiken ....................... 709/224 |
| 6,795,966 | B1 | * | 9/2004  | Lim et al. ........................ 718/1 |
| 7,110,540 | B2 | * | 9/2006  | Rajagopal et al. ............. 380/44 |
| 7,308,715 | B2 | * | 12/2007 | Gupta et al. ................... 726/23 |
| 7,451,216 | B2 | * | 11/2008 | McKinley et al. ........... 709/225 |
| 7,472,167 | B2 | * | 12/2008 | Tarquini ........................ 709/217 |
| 7,496,962 | B2 | * | 2/2009  | Roelker et al. ................. 726/23 |
| 7,607,170 | B2 | * | 10/2009 | Chesla ........................... 726/22 |
| 7,624,436 | B2 | * | 11/2009 | Balakrishnan et al. ......... 726/13 |
| 2004/0107361 | A1 | * | 6/2004 | Redan et al. .................. 713/201 |
| 2005/0198110 | A1 | * | 9/2005 | Garms et al. .................. 709/202 |

* cited by examiner

*Primary Examiner* — Dmitry H Levitan
(74) *Attorney, Agent, or Firm* — Patent Capital Group

(57) ABSTRACT

A system, method, and computer program product are provided for analyzing a protocol utilizing a state machine, based on a token determined utilizing another state machine. In use, a state of a protocol used within a data stream is identified. Additionally, at least one taken capable of initiating a change in the state of the protocol used within the data stream is determined utilizing a first state machine. Furthermore, the protocol is analyzed based on the at least one token, utilizing a second state machine.

19 Claims, 5 Drawing Sheets

SYSTEM, METHOD, AND COMPUTER PROGRAM PRODUCT FOR ANALYZING A PROTOCOL UTILIZING A STATE MACHINE BASED ON A TOKEN DETERMINED UTILIZING ANOTHER STATE MACHINE

FIELD OF THE INVENTION

The present invention relates to network data analysis, and more particularly to analyzing data streams.

BACKGROUND

Network data analysis has generally been utilized for identifying information associated with networks. Oftentimes, network systems performing such analysis are designed to analyze all data communicated over an associated network. For example, the network systems have traditionally performed the analysis of network data in order to ensure the security, reliability, and speed of networks. However, conventional systems utilized for performing network data analysis have exhibited various limitations, such as, for example, when a significant amount of network data is subject to analysis.

In general, ever-increasing network speeds often leave traditional hardware running operating systems unable to analyze all, or even a significant amount, of network packets communicated over the network. Further, sometimes the analysis includes determining whether network data matches predefined data (e.g. malware, etc.), such that even when analysis is possible for at least substantially all network data on a network, the analysis is inefficient. Just by way of example, hardware accelerated, pattern matching is usually performed for reporting matches found in a data stream, and many of the matches are oftentimes irrelevant. This therefore creates a large overload of identified matches which require further processing. There is thus a need for addressing these and/or other issues associated with the prior art.

SUMMARY

A system, method, and computer program product are provided for analyzing a protocol utilizing a state machine, based on a token determined utilizing another state machine. In use, a state of a protocol used within a data stream is identified. Additionally, at least one token capable of initiating a change in the state of the protocol used within the data stream is determined utilizing a first state machine. Furthermore, the protocol is analyzed based on the at least one token, utilizing a second state machine.

DETAILED DESCRIPTION

Figure 1:
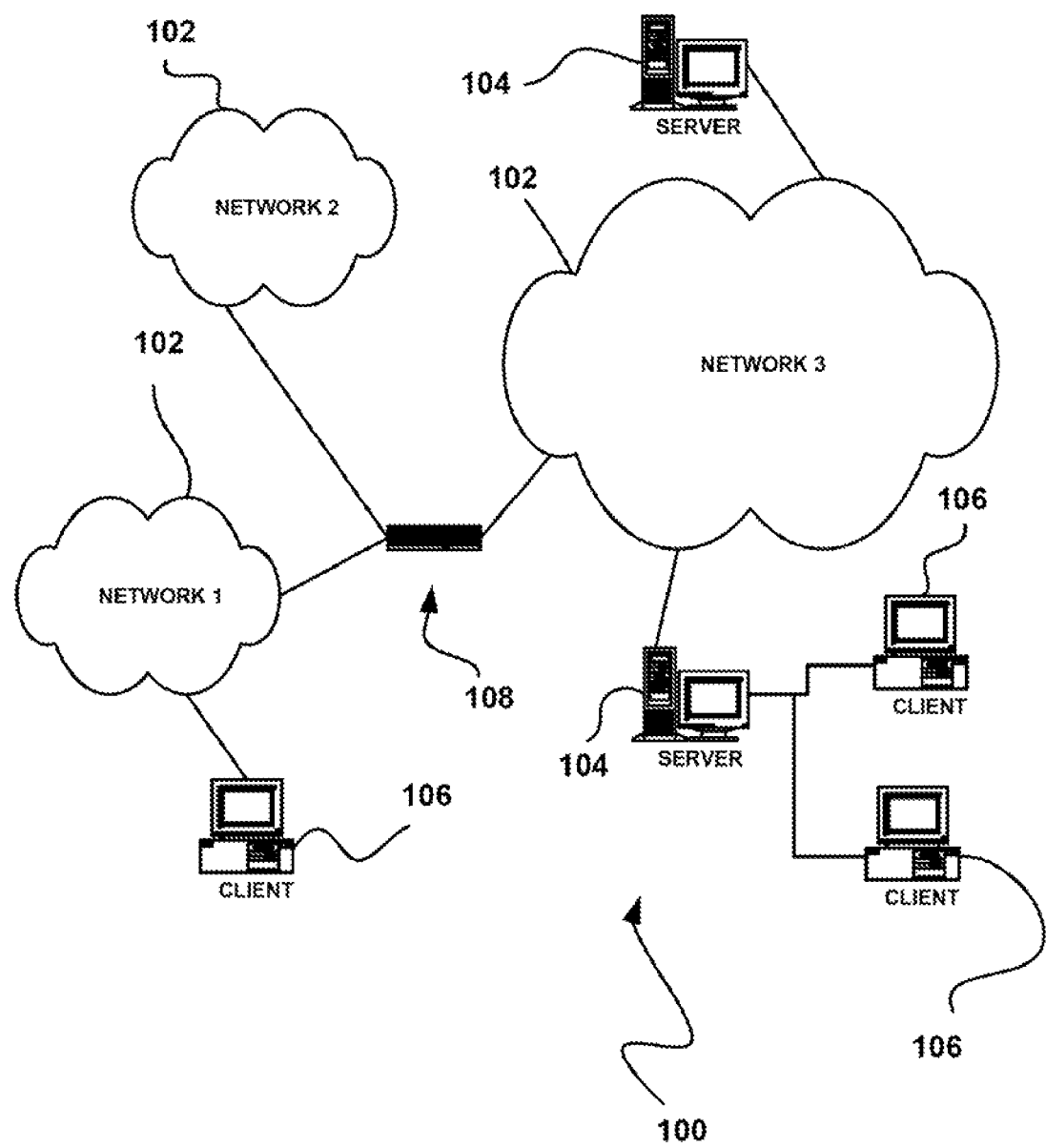
FIG. 1 illustrates a network architecture, in accordance with one embodiment.

FIG. 1 illustrates a network architecture 100, in, accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled there between.

Figure 2:
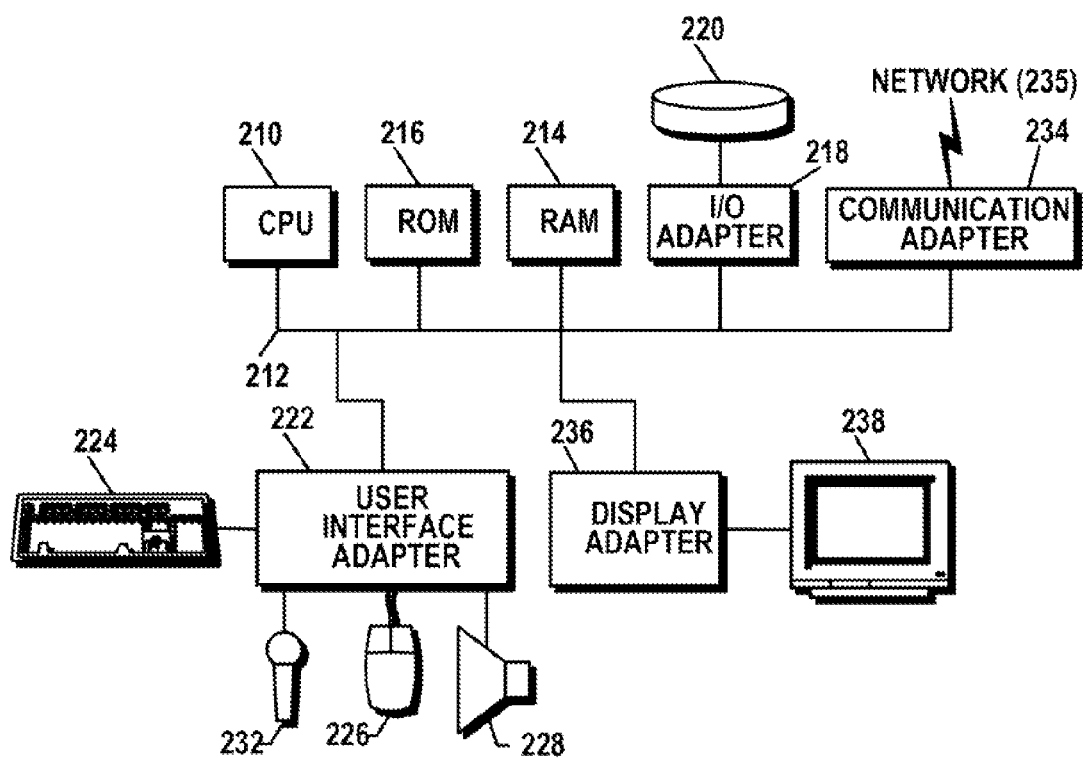
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown, in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
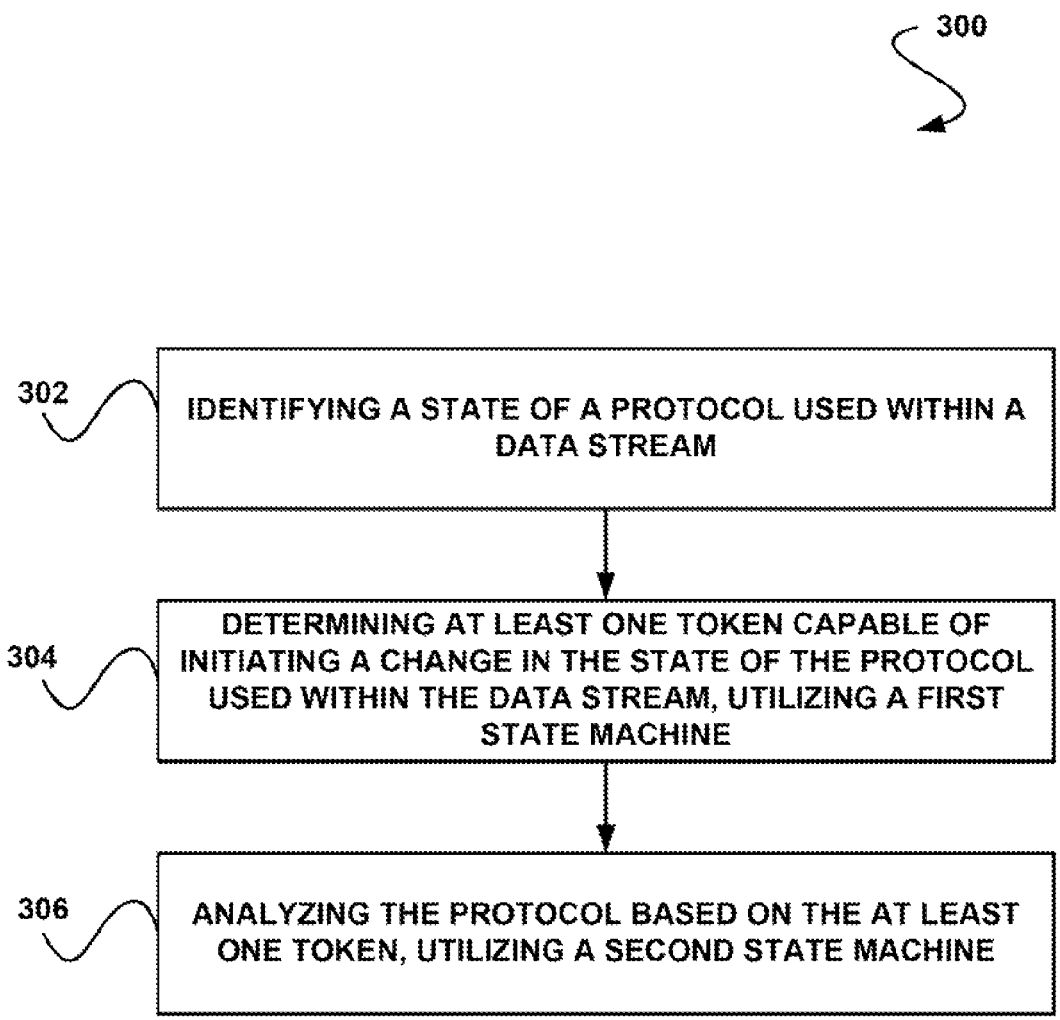
FIG. 3 shows a method for analyzing a protocol utilizing a second state machine, based on a token determined utilizing a first state machine, in accordance with one embodiment.

FIG. 3 shows a method 300 for analyzing a protocol utilizing a second state machine, based on a token determined utilizing a first state machine, in accordance with one embodiment. As an option, the method 300 may be carried out in the context of the architecture and environment of FIGS. 1 and/or 2. Of course, however, the method 300 may be carried out in any desired environment.

As shown in operation 302, a state of a protocol used within a data stream is identified. In the context of the present description, the data stream may be any stream of data utilized for communicating information. For example, the data stream may include one or a string of American Standard Code for Information Interchange (ASCII) characters, one or a string of binary characters, at least one packet (e.g. data packet), etc. As an option, the data stream may be utilized for communicating data over a network (e.g. such as any of the networks described above with respect to FIG. 1).

Additionally, the protocol used within the data stream may include any protocol capable of being used by a data stream for communicating information. In various embodiments, the protocol may control, enable, etc. communication of the information via the data stream. For example, the protocol may include Hypertext Transfer Protocol (HTTP), File Transfer Protocol (FTP), Network File System (NFS) protocol, etc. It should be noted that the protocol used within the data stream may be identified in any manner, such as for example, by parsing the data stream.

Furthermore, the state of the protocol may include any configuration capable of being associated with the protocol. Just by way of example, the state may include an open state, a closed state, a start state, an accept state, etc. As an option, the state of the protocol may be included in a list of particular to the protocol used by the data stream.

In one embodiment, the state may be identified by analyzing one or more portions of the data stream. For example, the state may be identified by analyzing one or more tokens in the data stream. In another embodiment, the state may be identified utilizing a virtual machine. Of course, however, the state may be identified in any manner.

Further, in operation 304, at least one token capable of initiating a change in the state of the protocol used within the data stream is determined utilizing a first state machine. In the context of the present description, the token may include any predetermined data that matches at least a portion of the data stream. Thus, the token may be determined by comparing the predetermined data to one or more portions of the data stream. Just by way of example, the token may be predetermined by a user. As another example, the token may be predetermined to be indicative of at least potential unwanted data (e.g. malware, etc.).

In one embodiment, the token may include one or more predetermined strings or a portion of a predetermined string. For example, the token may include part or all of a predetermined uniform resource locator (URL). As another example, the token may include part or all of a predetermined string of ASCII characters.

In yet another embodiment, the token may include predetermined binary data. For example, the token may include part or all of a binary file associated with the data stream, such as a binary file transmitted during the course of downloading network content. In another example, the token may include part or all of a predetermined binary string. In another embodiment, the token may include part or all of a Structured Query Language (SQL) string, query, communication, etc.

In addition, the token may be determined to be capable of initiating a change in the state of the protocol used within the data stream by comparing the token with a signature. In one embodiment, the signature may include an attack specification and/or a protocol specification. For example, the token may be compared against one or more portions of the protocol specification identifying predetermined tokens known to be capable of initiating a change in the particular state of the protocol. Thus, the signature may be particular to the state of the protocol, as an option.

Additionally, in one embodiment, the signature may be generated by merging the attack and protocol specifications into one file and converting such file into a binary block. For example, the attack and protocol specifications may be composed in an Extensible Markup Language (XML) editor, and a program may be executed which converts the specifications to a binary block. To this end, the first state machine may use all or part of the protocol specification portion of the signature for determining whether tokens identified with respect to the data stream are capable of initiating a change in the state of the protocol used within the data stream.

Furthermore, the first state machine may be any state machine capable of determining the token. In one embodiment, the first state machine may include a software pattern matching state machine. In another embodiment, the first state machine may include a finite automata state machine which utilizes a graph (e.g. tree graph, etc.) for determining the token. For example, the first state machine may include an Aho-Corasick algorithm. Thus, the first state machine may represent a parallel search algorithm. In another embodiment, the first state machine may be adapted to determine the tokens without respect to a case of characters included in the data stream. In yet another embodiment, the first state machine may be adapted to perform second-pass matching. For example, the first state machine may utilize a finite automata graphing technique during a first stage to identify the token, followed by a second stage in which a different algorithm is utilized to determine whether such identified token in fact matches a predetermined token capable of initiating a change in the state of the protocol.

In still another embodiment, the first state machine may identify masked tokens. For example, the first state machine may generalize a predetermined token by removing bits from the token. Further, in one embodiment the first state machine may maintain separate sets of configuration data (e.g. instantiate a separate graph for different protocols).

Further still, in one embodiment, an identifier of the token may be communicated. For example, the first state machine may communicate the identifier of the token determined to be capable of initiating a change in the state of the protocol used within the data stream. Optionally, the identifier of the token may be communicated to a second state machine, the reasons for which are set forth below.

Additionally, in operation 306, the protocol is analyzed based on the at least one token, utilizing a second state machine. In the context of the present description, the second state machine may include any state machine capable of analyzing the protocol. For example, the second state machine may include a virtual machine.

In one embodiment, the analyzing may include parsing the protocol. In another embodiment, the analyzing may include performing one or more operations utilizing the second state machine. For example, receipt of the identifier of the token at the second state machine may trigger one or more transition operations by the second state machine.

Optionally, the transition operations may be predefined for the token. Just by way of example, the signature (e.g. the protocol specification portion of the signature) may indicate transition operations particular to the token determined in operation 304. Thus, the second state machine may identify the transition operations based on the token (e.g. the identifier of the token received by the first state machine) and may perform such transition operations. The transition operations may include changing the state of the second state machine, communicating an alert (e.g. indicating the data stream includes unwanted data, etc.), turning on or off decryption and/or decoding of the data stream, storing, loading and comparing values at certain positions in the data stream (e.g. for boundary checks), registering other transition operations at certain offsets in the data stream, etc.

In another embodiment, the analyzing may include comparing data associated with the data stream against at least a portion of the signature. Such data associated with the data stream may include the token determined in operation 304, data generated via a transition operation, data stored in a register based on a transition operation, etc. For example, the attack portion of the signature may indicate known unwanted data. Thus, a match between the data associated with the data stream and the attack portion of the signature may indicate that at least a portion of the data stream includes unwanted data. Accordingly, an alert may optionally be issued, a transmission control protocol reset operation may be performed, a file associated with the data stream may be configured, etc.

In yet another embodiment, the transition operations may result in a change to the state of the second state machine, and therefore to the state of the protocol used within the data stream. In an optional embodiment, the second state machine may communicate its current state to the first state machine (see, just by way of example, operation 4G of FIG. 5). For example, the receipt of the at least one token at the second state machine may trigger a change to a new state in the second state machine (e.g. based on transitional operations performed, etc.), and the second state machine may communicate the new state to the first state machine. In this way, the first state machine may be capable of monitoring a state of the second state machine, and thus a state of the protocol used within the data stream.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
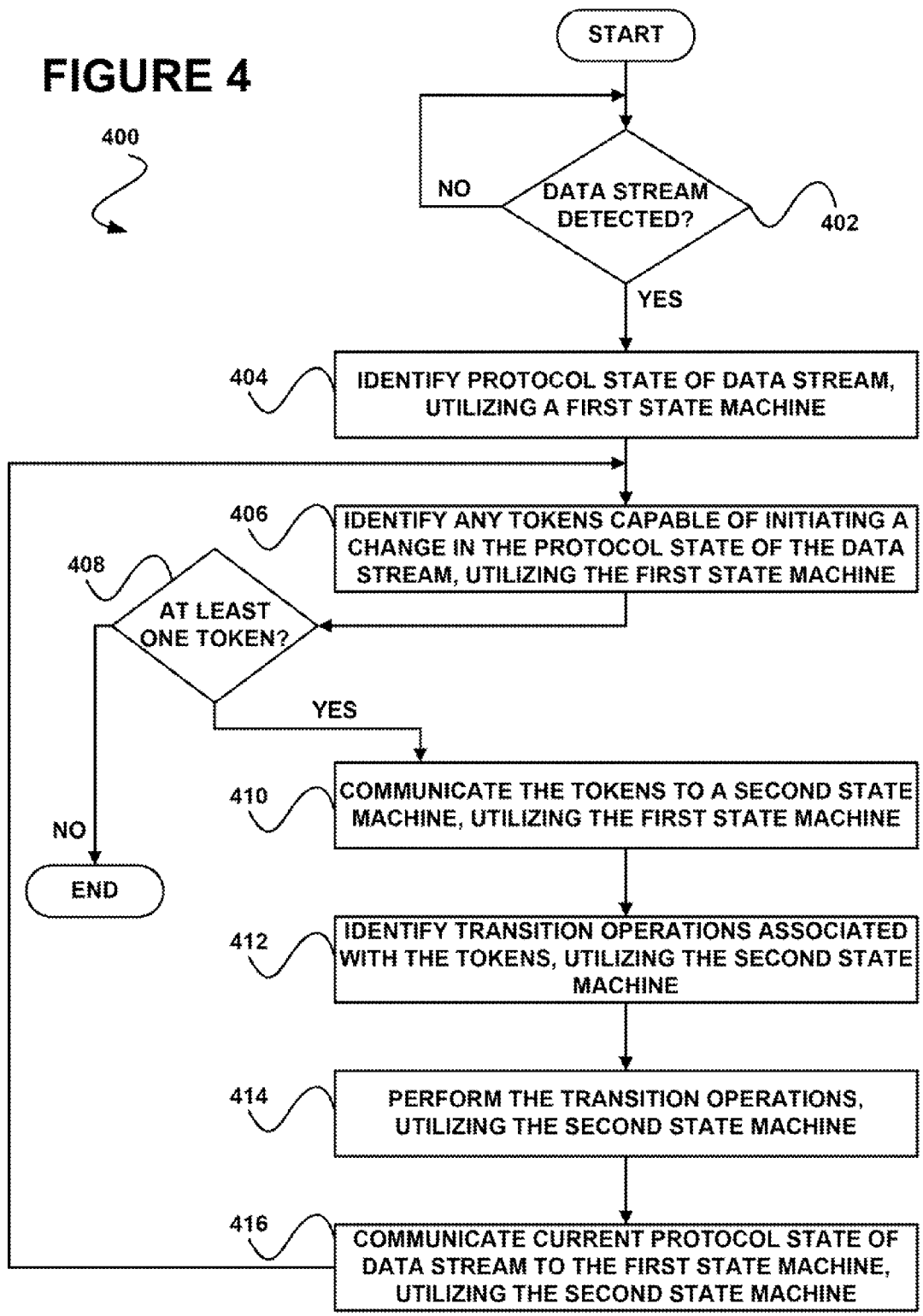
FIG. 4 shows a method for performing transition operations with respect to a data stream utilizing a second state machine and communicating a current protocol state of the data stream to a first state machine, in accordance with another embodiment.

FIG. 4 shows a method 400 for performing transition operations with respect to a data stream utilizing a second state machine and communicating a current protocol state of the data stream to a first state machine, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether a data stream is detected. In one embodiment, the data stream may be detected by monitoring data transferred over a network. In another embodiment, the data stream may be detected by receiving one or more network packets (e.g. at a device located on the network, etc.). In yet another embodiment, the data stream may be detected by monitoring an interaction of communicating parties. In still yet another embodiment, the data stream may be detected by actively intercepting the data stream and sending the data stream to a module for analyzing the data stream. Of course, however, the data stream may be detected in any manner.

In response to a determination in decision 402 that the data stream is detected, a protocol state of the data stream is identified utilizing a first state machine. Note operation 404. In the context of the present embodiment, the protocol state may include a state of a protocol utilized within the detected data stream. Further, the protocol state of the data stream may be identified in any manner that utilizes the first state machine. For example, the protocol state of the data stream may be identified based on a state of a second state machine Additionally, in operation 406, any tokens capable of initiating a change in the protocol state of the data stream are identified utilizing the first state machine. Just by way of example, the tokens may be identified in the manner described above with respect to operation 304 of FIG. 3. Moreover, the tokens may optionally be detected by comparing predefined tokens (e.g. particular to the state of the data stream) to the data stream for determining whether any of such predefined tokens are included in the data stream.

Further, in decision 408 it is determined whether at least one token is detected that is capable of initiating the change in the protocol state of the data stream. If at least one token is not detected in decision 408, the method 300 is terminated. However, if at least one token is detected in decision 408, any identified tokens are communicated to a second state machine utilizing the first state machine. See operation 410. As an option, the communicating the tokens may include communicating only an identifier unique to each of the tokens.

In one embodiment, the tokens that are communicated to the second state machine may be identified based at least in part on the state of the second state machine, and thus the state of the protocol used within the data stream. For example, the first state machine may dynamically prevent communication of a subset of predetermined tokens for which a match is not determined with respect to the data stream (in operation 406), if such subset if not associated with a current state of the second state machine. Thus, different subsets of predetermined tokens may be associated with different states of the protocol used within the data stream. In this way, the communication of tokens other than those that are capable of initiating the change in the current protocol state of the data stream may be prevented, thereby eliminating the detection and communication of irrelevant tokens.

In one embodiment, the tokens may be communicated to the second state machine via a callback function. In another embodiment, the tokens may be pushed to the second state machine. Of course, however, the tokens may be communicated to the second state machine in any manner. In yet another embodiment, the tokens identified in operation 406 may be prevented from being communicated to the second state machine until a predetermined event has occurred. For example, the communication of an identified token may be suspended until it is determined that the identified token is not a subset of another token.

In still another embodiment, the identified tokens may all be communicated when it is determined by the first state machine that all possible tokens have been identified. Optionally, an initial token match may be stored in a pending list until it is determined that no further predetermined tokens may possibly be identified with respect to the data stream. In one embodiment, the potential existence of other token matches may be determined based on a depth of a graph (e.g. tree structure, etc.) that includes the predetermined tokens. For example, one or more tokens may be held in a pending list until the complete depth of the graph has been traversed. In still another embodiment, the tokens may be communicated in an order relative to their size. For example, the longest token may be reported first, followed by the second largest token, etc.

Additionally, in operation 412, one or more transition operations associated with the communicated tokens are identified utilizing the second state machine. In the context of the present embodiment, the transition operations may include any operation capable of being performed with respect to the data stream. For example, the transition operations may include issuing an alert. In another example, the transition operations may include turning on or off stream decryption and/or decoding.

In yet another example, the transition operations may include at least one of storing, loading, and comparing values that occur at certain positions within the data stream for boundary checks. In still another example, the transition operations may include registering other transition operations at certain offsets of the data stream. Additionally, in another embodiment, the identifiers of the tokens may be associated with the transition operations. For example, one or more token identifiers may contain an associated list of transition operations.

Further, in operation 414, the transition operations are performed utilizing the second state machine. The virtual machine may optionally perform the transition operations in a controlled environment, such as utilizing a virtual machine. In another embodiment, the transition operations may only be performed if the second state machine is in a state based on which the received tokens were identified (in operation 406).

As an option, results of the transition operations may be compared against one or more portions of a signature indicating known unwanted data. For example, as the transition operations are executed, data associated with the transition operations may be stored in one or more registers. This data may further be compared against an attack specification of the signature in order to identify unwanted data associated with the data stream.

Further still, in operation 416, a current protocol state of the data stream is communicated to the first state machine, utilizing the second state machine. Optionally, the protocol state of the data stream may change in response to the performance of the transition operations in operation 414. Thus, such changed protocol state may be communicated to the first state machine. In one embodiment, the second state machine may implement a function which informs the first state machine of the current state of the second state machine. For example, the second state machine may issue a return of a callback function initiated by the first state machine.

Further, after the current protocol state of the data stream is communicated to the first state machine in operation 416, any additional tokens capable of initiating a change in the current protocol state of the data stream are identified utilizing the first state machine (operation 404). In this way, all tokens relevant to the current state of the second state machine may be identified by the first state machine.

Figure 5:
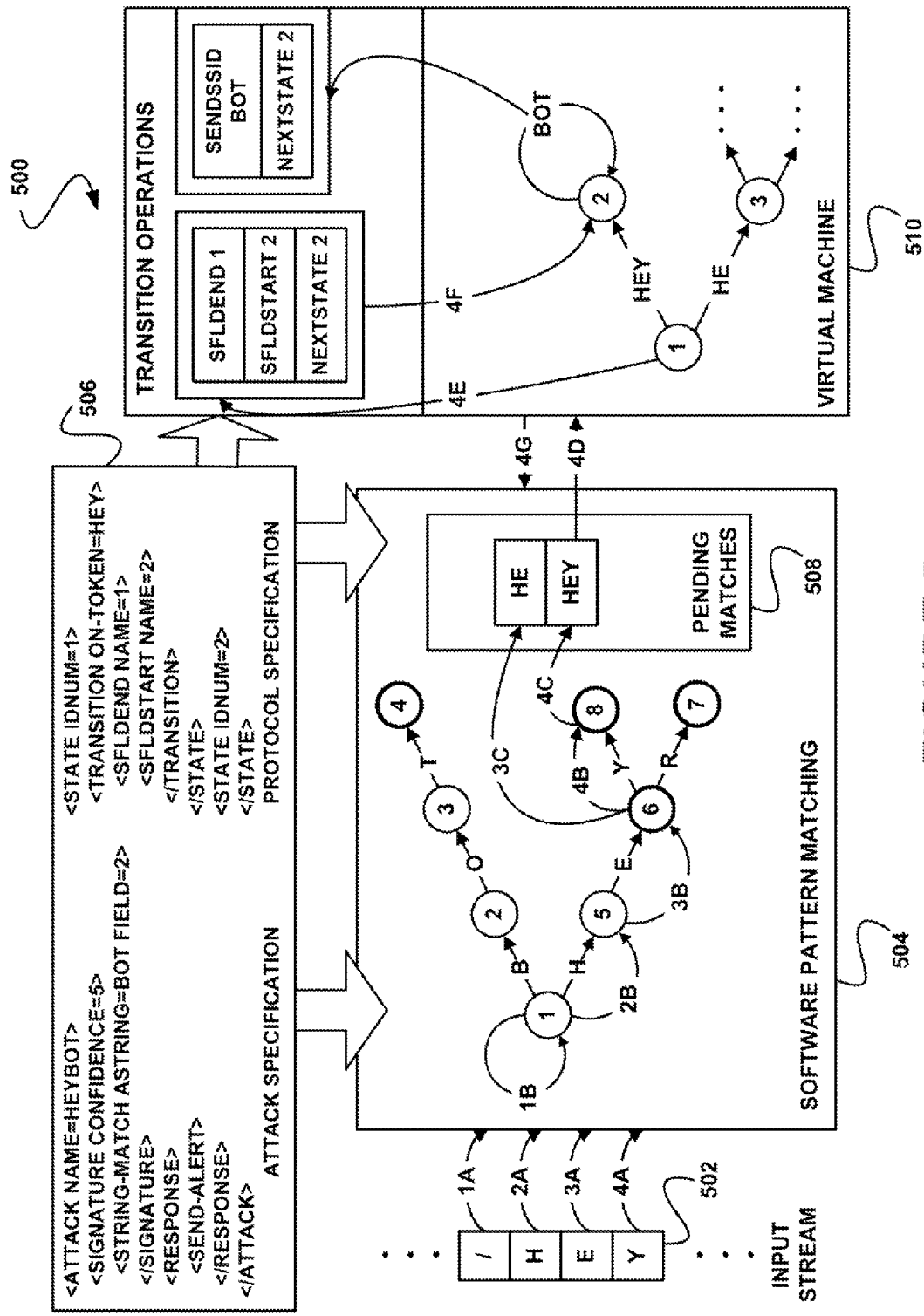
FIG. 5 illustrates a system for analyzing a protocol associated with an input data stream utilizing a virtual machine, based on a token determined utilizing a software pattern matching state machine, in accordance with still yet another embodiment.

FIG. 5 illustrates a system 500 for analyzing a protocol associated with an input data stream utilizing a virtual machine, based on a token determined utilizing a software pattern matching state machine, in accordance with still yet another embodiment. As an option, the system 500 may be implemented in the context of the architecture and environment of FIGS. 1-4. Of course, however, the system 500 may be implemented in any desired environment. Yet again, it should be noted that the aforementioned definitions may apply during the present description.

As shown, the configuration of a software pattern matching state machine 504 and a virtual machine 510 is read from an XML signature file 506 containing an attack specification and a protocol specification. The attack specification defines data known to be unwanted data when a protocol of a data stream including such data is in a particular state. The attack specification also defines operations for reacting to the unwanted data. This predefined state-based signature including unwanted data may be utilized to reduce false positives detections of unwanted data.

In addition, the protocol specification includes a list of predefined tokens associated with a particular state of a protocol of an input data stream 502 (shown as the graph of nodes including the token "HEY", "BOT", etc.). The protocol specification may therefore be particular to the state of the protocol of the input data stream 502. As another option, the protocol specification may include lists of predefined tokens, where each list is associated with a different possible state of a protocol of the input data stream 502. Further, in one embodiment, the predefined tokens may include tokens that, if included in the input data stream 502, would cause the state of the protocol used within the input data stream 502 to change.

As shown in step 1A, the character "/" is received from the input data stream 502 by the software pattern matching state machine 504. In step 1B, it is determined that the received character does not match any portion of a token indicated in the protocol specification. Accordingly, the graph is not traversed such that the state of the graph remains at node 1. Thus, in step 2A, the character "H" is received from the input stream 502 by the software pattern matching state machine 504. In step 2B, it is determined that the character matches a portion of a token indicated in the graph of the protocol specification. To this end, the graph is traversed to node 5.

In addition, in step 3A, the character "E" is received from the input stream 502 by the software pattern matching state machine 504. In step 3B it is determined that the character matches a next portion of the token starting at node 5, such that the graph is traversed to node 6. As shown, the graph indicates that "HE" is a predefined token, such that the string "HE" received from the input data stream 502 is stored in the pending list 508, as shown in step 3C. However, since node 6 is not located at the end of the branch being traversed in the graph, the token identifier for the input string "HE" is not immediately reported to the virtual machine 510.

Furthermore, in step 4A, the character "Y" is received from the input stream 502 by the software pattern matching state machine 504. In step 4B it is determined that the character matches a next portion of the token starting at node 6, such that the graph is traversed to node 8. Since the graph indicates that "HEY" is a predefined token, the string "HEY" received from the input data stream 502 is stored in the pending list 508, as shown in step 4C. In addition, since node 8 is located at the end of the branch being traversed in the graph, and since the identified token "HE" is a subset of "HEY", the identified token "HEY" is reported to the virtual machine 510 (e.g. via a callback function, etc.), as shown in step 510.

Additionally, at state 1 in the virtual machine 510 the token "HEY" is received. Transition operations associated with the token "HEY" are identified in the protocol specification, utilizing the virtual machine 510. See step 4E. The transition operations are then performed by the virtual machine 510. As also shown, one of the transition operations changes the state of the virtual machine 510, and thus the state of the protocol used within the input data stream 502, from state 1 to state 2. See step 4F. The virtual machine 502 then returns state 2 to the software pattern matching state machine 504 (e.g. via a callback return).

If, at state 2 of the virtual machine 510, the virtual machine receives the string "BOT" from the software pattern matching state machine 504 (in the manner described above with respect to the input data stream 502), an attack may be detected. For example, an attack will be detected if an input stream 502 with the string "HEY BOT" is read. Particularly, the virtual machine 510 may compare received strings with the attack specification which indicates known unwanted data, for determining whether such strings include unwanted data. As shown by way of example, if the token "BOT" is received at state 2 in the virtual machine 510, the transition operation "SENDSSID BOT" may be triggered by the virtual machine 510. This in turn may raise an attack under the attack specification in the signature file 506, which may include issuing an alert.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a state of a protocol used within a data stream;
   determining, utilizing a first state machine, at least one token capable of initiating a change in the state of the protocol used within the data stream;
   determining whether the token includes at least a portion of a uniform resource locator (URL), which is indicative of unwanted data;
   analyzing, utilizing a second state machine, the protocol based on the at least one token; and
   performing one or more transition operations associated with the at least one token, wherein the one or more transition operations include changing the state of the second state machine, and wherein a match between data in the data stream and known unwanted data indicates that at least a portion of the data stream includes unwanted data.

2. The method as set forth in claim 1, wherein the first state machine includes a software pattern matching state machine.

3. The method as set forth in claim 1, wherein the determining includes comparing predefined data with one or more portions of the data stream.

4. The method as set forth in claim 3, wherein the at least one token is determined based on a match of the predefined data and the one or more portions of the data stream.

5. The method as set forth in claim 3, wherein the predefined data includes a signature.

6. The method as set forth in claim 5, wherein the signature is particular to the state of the protocol.

7. The method as set forth in claim 1, wherein the second state machine includes a virtual machine.

8. The method as set forth in claim 1, wherein the second state machine communicates a current state of the protocol used within the data stream to the first state machine.

9. The method as set forth in claim 8, wherein the second state machine communicates the current state utilizing a return to a callback function return.

10. The method as set forth in claim 1, further comprising identifying one or more transition operations associated with the at least one token, utilizing the second state machine.

11. The method as set forth in claim 1, further comprising communicating the at least one token to the second state machine.

12. The method as set forth in claim 1, further comprising communicating an identifier of the at least one token to the second state machine.

13. The method as set forth in claim 1, further comprising determining whether the data stream includes unwanted data, based on the analysis.

14. The method as set forth in claim 1, wherein the at least one token is communicated to the second state machine when it is determined by the first state machine that all possible tokens have been identified with respect to the data stream.

15. The method as set forth in claim 1, wherein the at least one token is communicated to the second state machine in an order relative to size of the at least one token.

16. The method as set forth in claim 1, wherein the state of the protocol used within the data stream is included in a list particular to the protocol and includes one of an open state, a closed state, a start state, and an accept state.

17. A computer program product embodied on a non-transitory computer readable medium for performing operations, comprising:
   identifying a state of a protocol used within a data stream;
   determining, utilizing a first state machine, at least one token capable of initiating a change in the state of the protocol used within the data stream;
   determining whether the token includes at least a portion of a uniform resource locator (URL), which is indicative of unwanted data;
   analyzing, utilizing a second state machine, the protocol based on the at least one token; and
   performing one or more transition operations associated with the at least one token, wherein the one or more transition operations include changing the state of the second state machine, and wherein a match between data in the data stream and known unwanted data indicates that at least a portion of the data stream includes unwanted data.

18. A system, comprising:
   a processor;
   a first state machine for determining at least one token capable of initiating a change in a state of a protocol used within a data stream; and
   a second state machine for analyzing the protocol based on the at least one token;
   wherein a determination is made whether the at least one token includes at least a portion of a uniform resource locator (URL), which is indicative of unwanted data, and wherein one or more transition operations associated with the at least one token are performed, and wherein the one or more transition operations include changing the state of the second state machine, and wherein a match between data in the data stream and known unwanted data indicates that at least a portion of the data stream includes unwanted data.

19. The system as set forth in claim 18, wherein the first state machine and the second state machine are in communication with memory via a bus.

* * * * *